United States Patent
Dziurda et al.

(10) Patent No.: US 9,925,922 B2
(45) Date of Patent: Mar. 27, 2018

(54) SIDE VIEW MIRROR ASSEMBLY

(71) Applicant: GM GLOBAL TECHNOLOGY OPERATIONS LLC, Detroit, MI (US)

(72) Inventors: Robert A. Dziurda, Waterford, MI (US); Andrew K. Beach, Macomb Township, MI (US); Michael J. Wesner, Washington, MI (US); James C. O'Kane, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 163 days.

(21) Appl. No.: 15/010,606

(22) Filed: Jan. 29, 2016

(65) Prior Publication Data
US 2017/0217374 A1 Aug. 3, 2017

(51) Int. Cl.
*B60R 1/06* (2006.01)
*B60R 1/07* (2006.01)
(52) U.S. Cl.
CPC . *B60R 1/06* (2013.01); *B60R 1/07* (2013.01)
(58) Field of Classification Search
None
See application file for complete search history.

(56) References Cited

U.S. PATENT DOCUMENTS

| | | | | |
|---|---|---|---|---|
| 3,751,141 A | * | 8/1973 | Brown | B60R 1/0612 359/873 |
| 2002/0130241 A1 | * | 9/2002 | Yoshida | B60R 1/06 248/476 |
| 2004/0129853 A1 | * | 7/2004 | Suzuki | B60Q 1/2665 248/475.1 |
| 2007/0084707 A1 | * | 4/2007 | van den Brink | B60R 1/074 200/329 |
| 2015/0028615 A1 | * | 1/2015 | Takata | B60R 1/06 296/1.11 |

* cited by examiner

*Primary Examiner* — Kimberly N Kakalec
(74) *Attorney, Agent, or Firm* — Quinn IP Law

(57) ABSTRACT

A mirror assembly includes a stem attached to a mirror head. The stem includes a first portion directly attached to the mirror head. The first portion includes a catch. The second portion is attached to a support structure, and includes a retention portion. The catch of the first portion is engaged with the retention portion of the second portion for supporting the first portion and the mirror head relative to the second portion. Once the first portion is supported by the interaction between the catch and the retention portion, fasteners may be installed to fixedly attach the first portion to the second portion.

15 Claims, 4 Drawing Sheets

SIDE VIEW MIRROR ASSEMBLY

TECHNICAL FIELD

The disclosure generally relates to a side view mirror, and more particularly to a stem interconnecting the side view mirror to a support structure.

BACKGROUND

A side view mirror may be attached to a support structure. The side view mirror includes a housing, which moveably supports a mirror. The side view mirror enables a person to view in a rearward or opposite direction without turning around. The side view mirror may be attached to any support structure, such as a building, but is most commonly used and attached to vehicles, such as cars, trucks, boats, motorcycles, trains, tractors, etc. The side view mirror must be securely attached to the support structure, and provide a path for a conduit feature, which may, for example, connect a drive motor to a control system, such as a switch, to control a position of a mirror.

SUMMARY

A mirror assembly is provided. The mirror assembly includes a mirror head having a housing that moveably supports a mirror. A stem is attached to the mirror head. The stem includes a first portion and a second portion. The first portion is directly attached to the housing of the mirror head. The second portion is configured for attachment to a support structure. One of the first portion and the second portion includes a catch, and the other of the first portion and the second portion includes a retention portion. The catch of the first portion is engaged with the retention portion of the second portion for supporting the first portion and the mirror head relative to the second portion.

A method of attaching a mirror assembly to a support structure is also provided. The method includes attaching a mirror head to a first portion of a stem. A second portion of the stem is attached to the support structure with at least one attachment fastener. A catch of the first portion is hooked around a retention portion of the second portion, such that the first portion and the mirror head are supported by the catch, relative to the second portion. The second portion is then attached to the first portion with at least one connecting fastener.

Accordingly, the two piece stem, including the first portion and the second portion, provides a secure connection for attaching the mirror head to the support structure, such as a door structure of a vehicle. The first portion and the second portion of the stem may be manufactured from a metal, providing a slim cross section, and may be painted according to a desired color scheme, thereby eliminating any cladding. The stem has a low profile, yet is strong and conceals the fasteners used to connect the stem to the support structure. The unique design of the stem also provides for an easy, quick installation process.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
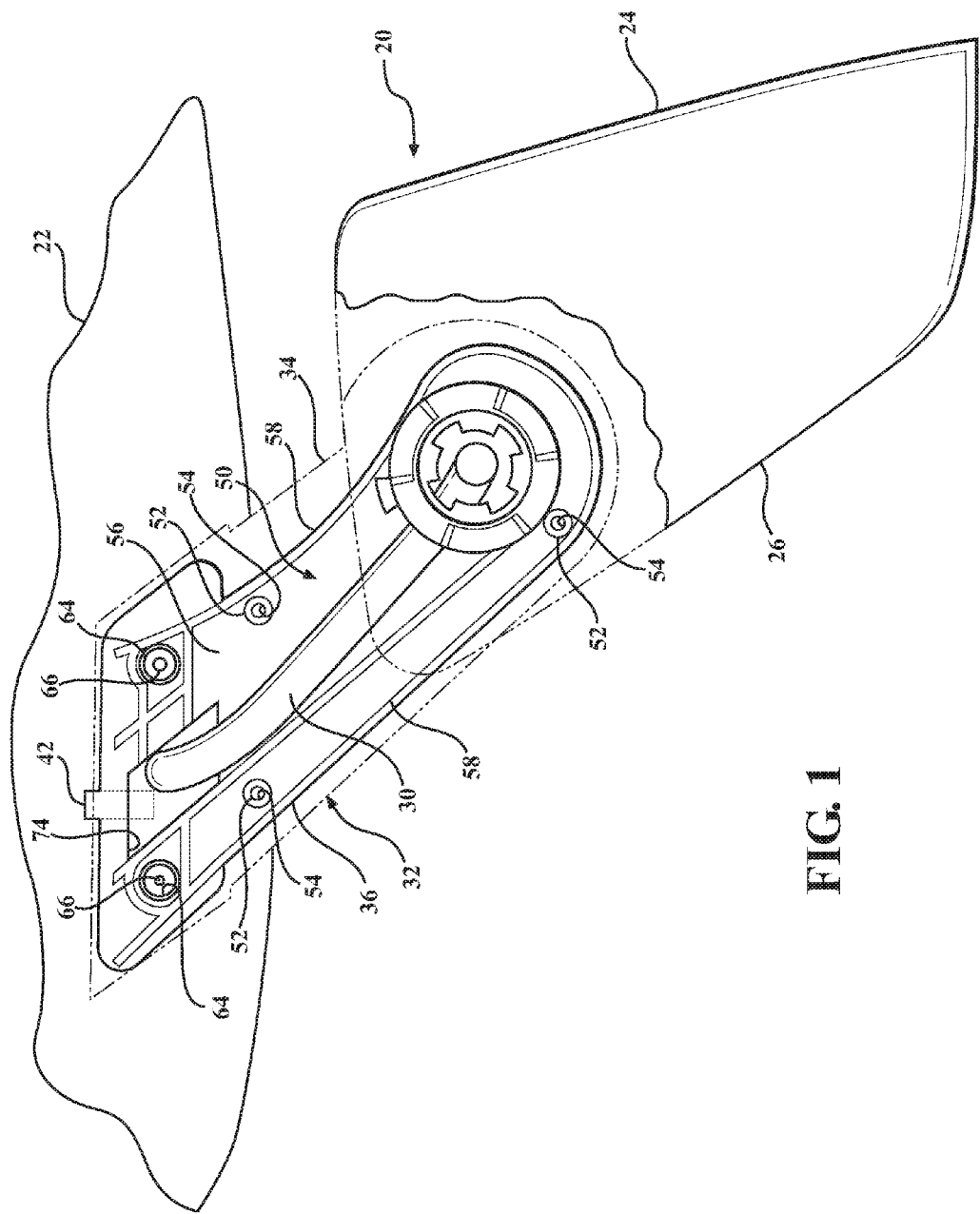
FIG. 1 is a schematic plan view of a mirror assembly attached to a support structure.

Referring to the Figures, wherein like numerals indicate like parts throughout the several views, a mirror assembly is generally shown at 20. The mirror assembly 20 may be attached to a support structure 22. Referring to FIG. 1, the support structure 22 is shown as a door structure of a vehicle. However, it should be appreciated that the support structure 22 may include any other structure capable of supporting the mirror assembly 20. For example, the support structure 22 may include, but is not limited to, a vehicle such as a car, truck, boat, plane, bus, train, tractor, etc., or may alternatively include a building or some other non-mobile structure. It should be appreciated that the support structure 22 may include some other structure not specifically described herein.

Figure 2:
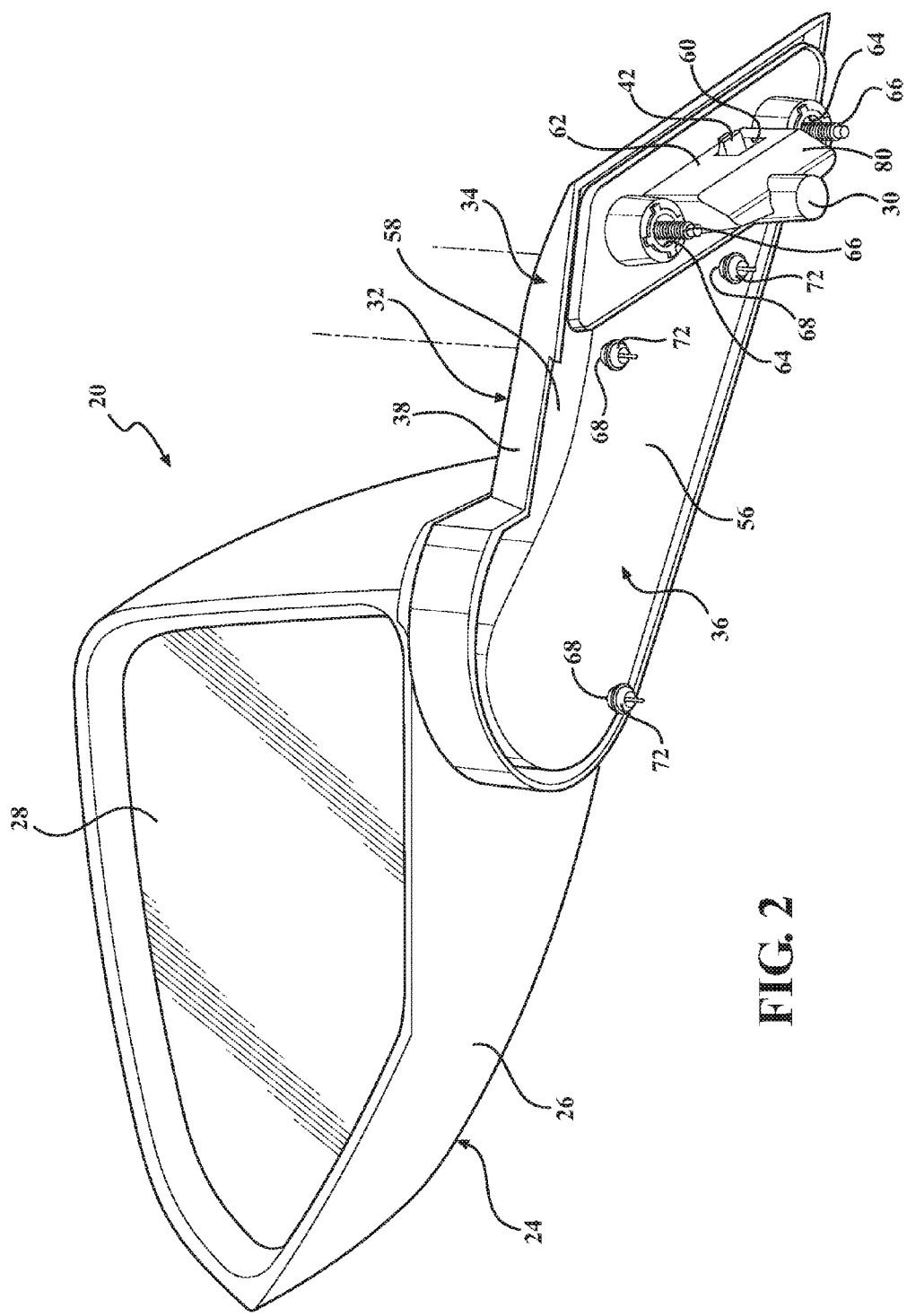
FIG. 2 is a schematic perspective view of the mirror assembly.
Figure 3:
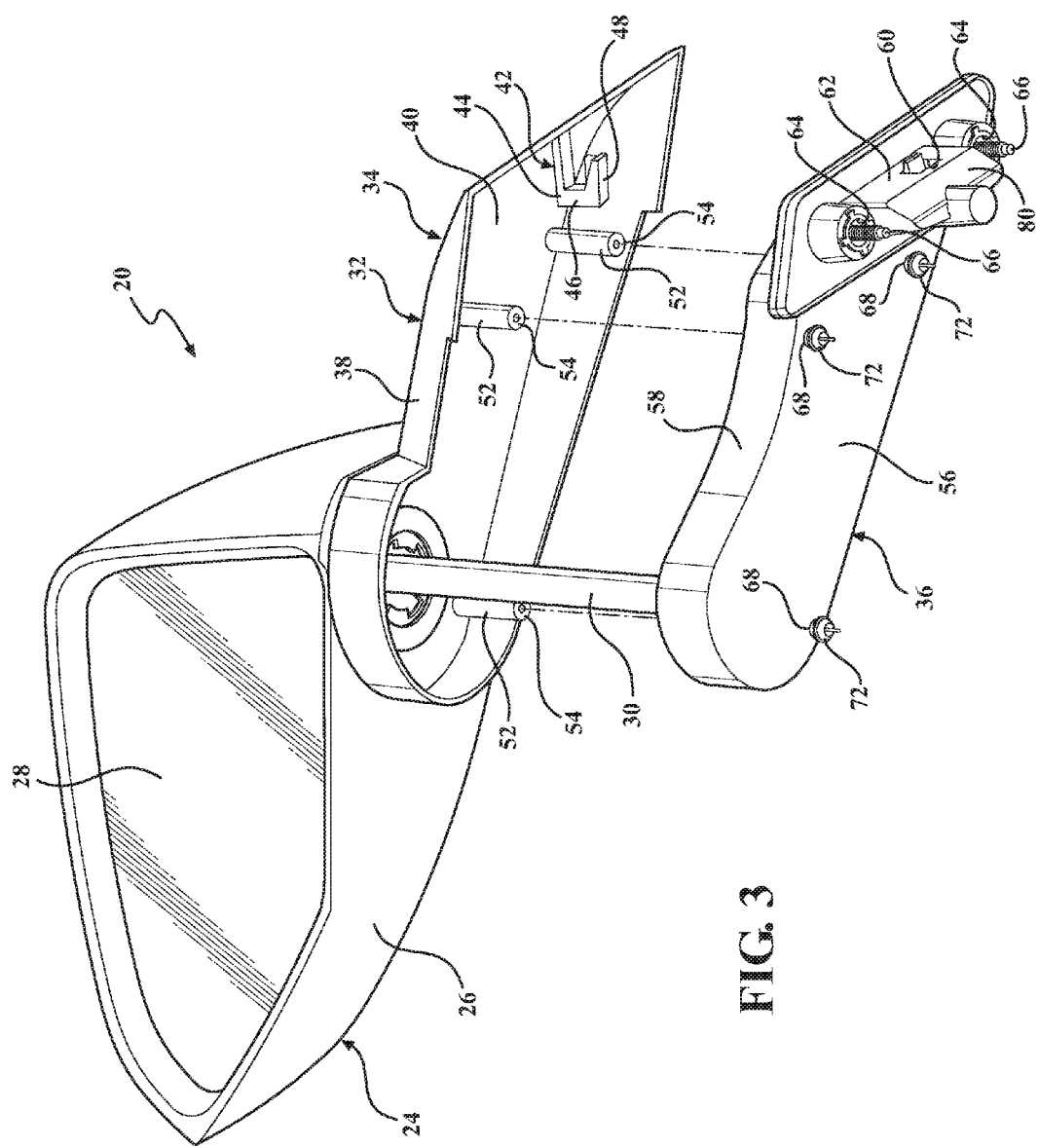
FIG. 3 is a schematic exploded perspective view of the mirror assembly.

Referring to FIGS. 1-3, the mirror assembly 20 includes a mirror head 24. The mirror head 24 includes a housing 26, which moveably supports a mirror 28. The mirror 28 may be supported by the housing 26 in any suitable manner, and is preferably adjustable in three dimensions. The mirror head 24 may further include one or more actuators (not shown), such as an electric motor or other similar device, which is coupled to the mirror 28 and controllable to adjust a position of the mirror 28 relative to the housing 26 in at least one dimension. It should be appreciated that the head assembly may include multiple actuators that may be controlled to adjust the position of the mirror 28 in all three dimensions. A control or wiring harness, not shown, may be attached to the actuators. The wiring harness passes through conduit feature 30, and extends from the mirror head 24 to a remote location, such as to within a passenger cabin, to connect the actuator to a control device, such as a switch. The conduit feature 30 defines a hollow interior, through which the wiring harness may pass. The conduit feature may be a separate piece, or may be integrally formed with either a first portion 34 or a second portion 36 of a stem 32, described in detail below.

Referring to FIGS. 1 through 3, the stem 32 is attached to the mirror head 24, and connects the mirror head 24 to the support structure 22. The stem 32 includes the first portion 34 and the second portion 36. Preferably, the first portion 34 and the second portion 36 are each formed from a metal. In one exemplary embodiment, the first portion 34 includes and is formed from aluminum or an aluminum alloy, and the second portion 36 includes and is formed from magnesium or a magnesium alloy. It should be appreciated that the first portion 34 and the second portion 36 may be formed from other metals than those specifically mentioned herein. Furthermore, it should be appreciated that other embodiments may include the first portion 34 and the second portion 36 formed from non-metal materials, such as but not limited to a plastic or nylon material. Accordingly, the first portion 34 and the second portion 36 should not be limited to manufactures from a metal.

Referring to FIGS. 1-3, the first portion 34 is directly attached to the housing 26 of the mirror head 24. The first portion 34 may be attached to the mirror head 24 in any suitable manner. For example, the first portion 34 may be attached to the mirror head 24 via one or more fasteners. Alternatively, the first portion 34 may be attached to the mirror head 24 via a rotatable connection, which allows the entire mirror head 24 to rotate about an axis relative to the stem 32. The specific manner that the mirror head 24 is attached to the first portion 34 is not pertinent to the teachings of this disclosure, and are therefore not described in detail herein.

Referring to FIG. 3, the first portion 34 operates as a cover for the second portion 36, and includes at least one side wall 38 and a top wall 40. The top wall 40 and the side wall 38 cooperate to form a covered interior region vertically underneath the top wall 40. The top wall 40 includes a catch 42. As best shown in FIG. 3, the catch 42 is formed in a general hook shape, and includes a first section 44 attached to the top wall 40, a second section 46 extending vertically downward from the first section 44, and a third section 48 extending from the second section 46 in generally spaced, parallel relationship relative to the first section 44 to form a space between the first section 44 and the second section 46.

Referring to FIG. 3, the first portion 34 further includes at least one boss 52. As best shown in FIG. 3, the first portion 34 includes three bosses 52. Each boss 52 of the first portion 34 defines a threaded bore 54 for receiving a fastener therein, described in greater detail below. While the exemplary embodiment of the stem 32 shown in the Figures includes three bosses 52 in the first portion 34, it should be appreciated that other embodiments of the mirror assembly 20 may include fewer than or more than the three bosses 52 shown in the exemplary embodiment.

Figure 4:
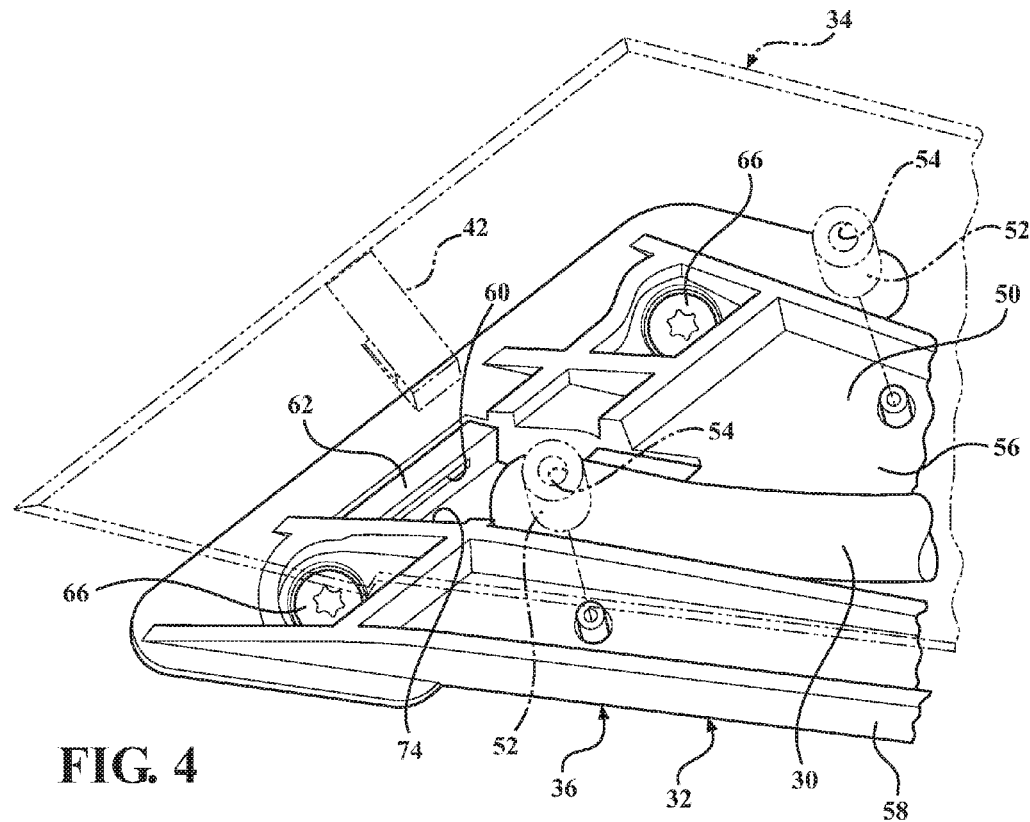
FIG. 4 is a schematic partial perspective view from above of the mirror assembly.

The second portion 36 is configured for attachment to the support structure 22, and to mate with the first portion 34. As best shown in FIGS. 3 and 4, the second portion 36 includes a bottom wall 56, and at least one side wall 58 extending upward from the bottom wall 56, toward the top wall 40 of the first portion 34. As best shown in FIG. 4, the bottom wall 56 and the side wall 58 of the second portion 36 cooperate to form a channel 50 therebetween. The side wall 38 of the first portion 34 is disposed laterally outside of the side wall 58 of the second portion 36, so as to cover and/or conceal the second portion 36.

Figure 5:
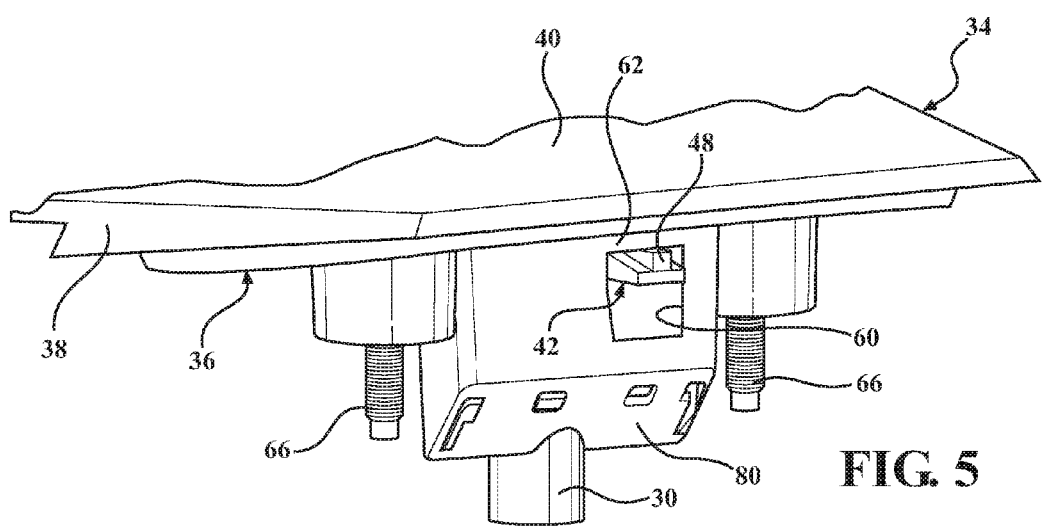
FIG. 5 is a schematic partial perspective view from an inboard side of the mirror assembly.

Referring to FIG. 4, the bottom wall 56 of the second portion 36 defines a slot 60. A retention portion 62 of the bottom wall 56 extends across the slot 60. Although the exemplary embodiment shown in the Figures includes the first portion 34 having the catch 42, and the second portion 36 having the retention portion 62, it should be appreciated that the relative positions of the catch 42 and the retention portion 62 may be reversed, with the first portion 34 having the retention portion 62, and the second portion having the catch 42. Referring to FIG. 5, the catch 42 of the first portion 34 is engaged with the retention portion 62 of the second portion 36 for supporting the first portion 34 and the mirror head 24 relative to the second portion 36. The first section 44 of the catch 42 is generally parallel with the retention portion 62, and is disposed against an upper surface of the retention portion 62. The third section 48 of the catch 42 is also generally parallel with the retention portion 62, and is disposed against a lower surface of the retention portion 62. The second section 46 of the catch 42 spaces the first section 44 and the second section 46 apart from each other, a distance that is approximately equal to a thickness of the retention portion 62. The interaction and/or engagement between the catch 42 and the retention portion 62 provides a snug fit to secure the first portion 34 relative to the second portion 36, as well as to align the first portion 34 relative to the second portion 36 in a desired orientation and/or position for assembly and attachment to the second portion 36.

Referring to FIG. 4, the second portion 36 includes at least one opening 64 extending through the bottom wall 56 of the second portion 36. An attachment fastener 66 extends from above, through the opening 64 in the bottom wall 56 of the second portion 36, and into interlocking engagement with the support structure 22 for attaching the second portion 36 to the support structure 22. As shown in the exemplary embodiment, the second portion 36 includes two openings 64, and the mirror assembly 20 includes two attachment fasteners 66, with one attachment fastener 66 extending through one opening 64 for attaching the second portion 36 to the support structure 22. While the exemplary embodiment shows two attachment fasteners 66 and openings 64, it should be appreciated that the second portion 36 may be configured differently than shown in the exemplary embodiment, and that the mirror assembly 20 may include only a single attachment fastener 66, or may include more than the two attachment fasteners 66 shown in the exemplary embodiment. Preferably, the attachment fastener 66 includes a threaded fastener such as a bolt or a screw. However, it should be appreciated that the attachment fastener 66 may include some other type and/or style of fasteners, and should not be limited to a threaded fastener.

As noted above, the first portion 34 includes at least one boss 52 defining a threaded bore 54. Referring to FIGS. 2 and 3, the second portion 36 defines an aperture 68 aligned with each of the threaded bores 54 along an axis. A connecting fastener 72 extends from below, through the aperture 68 and into threaded engagement with the threaded bore 54. While the exemplary embodiment shown in the Figures and described herein includes three connecting fasteners 72, it should be appreciated that the number of apertures 68 and the corresponding number of connecting fasteners 72 may vary, and may include less than the three shown, or more than the three shown in the exemplary embodiment.

Referring to FIG. 4, the second portion 36 defines an access hole 74 through the bottom wall 56. As shown in the exemplary embodiment, the access hole 74 is part of or defined by the slot 60. However, in other embodiments, the access hole 74 may be separate from the slot 60. As noted above, the mirror head 24 includes the conduit feature 30. The conduit feature 30 passes between the first portion 34 and the second portion 36, through a central portion of the channel 50 defined by the second portion 36, through the access hole 74, and into the support structure 22. Accordingly, the conduit feature 30 is routed through a central region of the stem 32, within the channel 50 of the second portion 36, and covered by the first portion 34, thereby concealing and supporting the conduit feature 30.

Referring to FIGS. 2, 3 and 5, the second portion 36 includes a projecting portion 80. The projecting portion 80 extends downward from the bottom wall 56 of the second portion 36. The projecting portion 80 fits within a pocket (not shown) defined by the support structure 22. The projecting portion 80 and the pocket are sized and shaped to snugly mate together, such that the projecting portion may easily slide into the pocket, with little lash therebetween. The projecting portion 80 may include, but is not limited to, a wedge shape, e.g., a triangular cross sectional shape.

However, it should be appreciated that the projecting portion 80 may be configured to have any shape that extends downward from the bottom wall 56 of the second portion 36, and may be configured as simply as a rod, post, etc. The projecting portion 80 extends downward from the bottom wall 56 a distance, so that the interaction between the projecting portion 80 and the pocket near the bottom of the projecting portion 80 provides a sufficient moment or torque to resist bending or flexing of the bottom wall 56 relative to the support structure 22, thereby stabilizing the stem 32 relative to the support structure 22.

The design of the stem 32 allows for a unique method of attaching the mirror assembly 20 to the support structure 22. The method includes forming the first portion 34 and the second portion 36. In the exemplary embodiment, the first portion 34 and the second portion 36 are formed from a metal, such as from aluminum and/or magnesium respectively. The first portion 34 and the second portion 36 may be formed in any suitable manner, such as by casting and/or machining processes known to those skilled in the art. It should be appreciated that each of the first portion 34 and the second portion 36 may be single pieces of manufacture, or may include multiple pieces of manufacture that are attached together, such as by molding, press fitting, etc.

Once the first portion 34 and the second portion 36 have been formed, they may be prepared for installation. Preparation for installation may include, but is not limited to preparing an exterior surface of the first portion 34 and the second portion 36 for painting, and then painting the first portion 34 and the second portion 36 to provide a desired color and/or color scheme.

After the first portion 34 has been formed and prepared, the first portion 34 is attached to the mirror head 24. The first portion 34 may be attached to the mirror head 24 in any manner, such as through the use of one or more fasteners, a rotatable snap fit connection, or in some other manner. After the second portion 36 has been formed and prepared, the second portion 36 is attached to the support structure 22. The second portion 36 may be attached to the support structure 22 in any suitable manner. For example, the projecting portion 80 is slid into a receiving pocket of the support structure 22, and one or more attachment fasteners 66 may be passed through the openings 64 in the bottom wall 56, and into interlocking engagement with the support structure 22. It should be appreciated that the projecting portion 80 of the second portion 36 is sized and/or shaped to fit within the pocket of the support structure 22, and that the pocket of the support structure 22 may include the necessary features to mate with the projecting portion 80 and secure the second portion 36 relative to the support structure 22.

After the mirror head 24 has been attached to the first portion 34, and the second portion 36 has been attached to the support structure 22, the conduit feature 30 is routed from the mirror head 24, through the access hole 74 in the second portion 36 and into the support structure 22, before attaching the second portion 36 to the first portion 34. The conduit feature 30 is positioned within the channel 50 defined by the second portion 36. The catch 42 of the first portion 34 is then hooked around the retention portion 62 of the second portion 36, such that the first portion 34 and the mirror head 24 are supported by the catch 42, relative to the second portion 36. In order to hook the catch 42 of the first portion 34 over the retention portion 62 of the second portion 36, the catch 42 is passed through the slot 60 so that the third section 48 of the catch 42 may slide under and hook onto the retention portion 62.

The catch 42 engages the retention portion 62 to secure the first portion 34 relative to the second portion 36, as well as to align the apertures 68 in the second portion 36 with the threaded bores 54 in the first portion 34. Once the first portion 34 is secured to the second portion 36 via the engagement between the catch 42 and the retention portion 62, the second portion 36 may be permanently affixed to the first portion 34 by passing the connecting fasteners 72 through the apertures 68, and into threaded engagement with the threaded bores of the first portion 34. In so doing, the attachment fasteners 66, which attach the second portion 36 to the support structure 22, are hidden and/or covered by the first portion 34, and the connecting fasteners 72, which connect the second portion 36 to the first portion 34, are disposed on an underside of the second portion 36, out of view. This configuration enables a "top down" attachment of the stem 32 to the support structure 22, that is concealed from view from above once complete, the first portion 34 covers the attachment fasteners 66 with no plan view split lines from above.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A mirror assembly comprising:
a mirror head including a housing moveably supporting a mirror;
a stem attached to the mirror head, the stem including:
a first portion directly attached to the housing of the mirror head, the first portion including a top wall and a side wall;
a second portion configured for attachment to a support structure, the second portion including a bottom wall and a side wall, with the bottom wall including an access hole, and with the bottom wall and the side wall of the second portion forming a channel therebetween;
wherein one of the first portion and the second portion includes a catch, and the other of the first portion and the second portion includes a retention portion;
wherein the catch is engaged with the retention portion for supporting the first portion and the mirror head relative to the second portion;
wherein the top wall of the first portion is disposed above the bottom wall of the second portion to cover the second portion, and with the side wall of the first portion disposed laterally outside of the side wall of the second portion to conceal the second portion; and
a conduit feature passing between the first portion and the second portion, through the channel of the second portion, and through the access hole in the bottom wall of the second portion.

2. The side view mirror set forth in claim 1 wherein a wall of the second portion defines a slot, with the retention portion extending across the slot.

3. The side view mirror set forth in claim 1 wherein the first portion includes a boss defining a threaded bore.

4. The side view mirror set forth in claim 3 wherein the second portion defines an aperture aligned with the threaded bore along an axis.

5. The side view mirror set forth in claim 4 further comprising a connecting fastener extending through the aperture and into threaded engagement with the threaded bore.

6. The side view mirror set forth in claim 1 wherein the second portion includes an opening.

7. The side view mirror set forth in claim 6 further comprising an attachment fastener extending through the opening for attaching the second portion to the support structure.

8. The side view mirror set forth in claim 1 wherein the first portion and the second portion are each formed from a metal.

9. The side view mirror set forth in claim 8 wherein the first portion includes aluminum, and the second portion includes magnesium.

10. The side view mirror set forth in claim 1 wherein the second portion includes a projecting portion extending downward from a bottom wall of the second portion, and configured to be received within a pocket of the support structure.

11. A vehicle comprising:
a door structure;
a mirror head including a housing moveably supporting a mirror;
a stem interconnecting the door structure and the mirror head, the stem including:
a first portion directly attached to the housing of the mirror head, and including a catch and a boss defining a threaded bore;
wherein the first portion includes a top wall and a side wall;
a second portion directly attached to the door structure, and including a slot with a retention portion extending across the slot, and an aperture aligned with the threaded bore along an axis;
wherein the second portion includes a bottom wall and a side wall, with the bottom wall including an access hole, and with the bottom wall and the side wall of the second portion forming a channel therebetween;
wherein the catch of the first portion is disposed within and extends through the slot, into engagement with the retention portion, for supporting the first portion and the mirror head relative to the second portion;
a connecting fastener extending through the aperture and into threaded engagement with the threaded bore
wherein the top wall of the first portion is disposed above the bottom wall of the second portion to cover the second portion, and with the side wall of the first portion disposed laterally outside of the side wall of the second portion to conceal the second portion; and
a conduit feature passing between the first portion and the second portion, through the channel of the second portion, and through the access hole in the bottom wall of the second portion.

12. The vehicle set forth in claim 11 wherein the second portion includes an opening, and wherein the vehicle further comprises an attachment fastener extending through the opening in the second portion and into engagement with the door structure for attaching the second portion to the door structure.

13. A method of attaching a mirror assembly to a support structure, the method comprising:
attaching a mirror head to a first portion of a stem;
attaching a second portion of the stem to the support structure with at least one attachment fastener;
hooking a catch of the first portion around a retention portion of the second portion such that the first portion and the mirror head are supported by the catch, relative to the second portion;
attaching the second portion to the first portion with at least one connecting fastener; and
feeding a conduit feature from the mirror head through an access hole in the second portion and into the support structure before attaching the second portion to the first portion.

14. The method set forth in claim 13 further comprising forming at least one of the first portion or the second portion from a metal.

15. The method set forth in claim 13 wherein attaching the second portion of the stem to the support structure includes sliding a projecting portion of the second portion into a pocket of the support structure.

* * * * *